(12) United States Patent
Satou

(10) Patent No.: US 10,350,758 B2
(45) Date of Patent: Jul. 16, 2019

(54) ROBOT CONTROL UNIT FOR ASSEMBLY ROBOT

(71) Applicant: FANUC CORPORATION, Yamanashi (JP)

(72) Inventor: Takashi Satou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 206 days.

(21) Appl. No.: 15/672,056

(22) Filed: Aug. 8, 2017

(65) Prior Publication Data

US 2018/0043540 A1 Feb. 15, 2018

(30) Foreign Application Priority Data

Aug. 10, 2016 (JP) .................. 2016-157081

(51) Int. Cl.
*G05B 19/418* (2006.01)
*G06F 19/00* (2018.01)
*B25J 9/16* (2006.01)
*B25J 13/08* (2006.01)

(52) U.S. Cl.
CPC .......... *B25J 9/1687* (2013.01); *B25J 9/1633* (2013.01); *B25J 9/1682* (2013.01); *B25J 13/085* (2013.01); *G05B 2219/39129* (2013.01)

(58) Field of Classification Search
None
See application file for complete search history.

(56) References Cited

U.S. PATENT DOCUMENTS 5,668,747 A 9/1997 Ohashi

FOREIGN PATENT DOCUMENTS

| EP | 2743040 A2 | 6/2014 |
|---|---|---|
| JP | H05253883 A | 10/1993 |
| JP | H07248778 A | 9/1995 |
| JP | H08174460 A | 7/1996 |
| JP | H09248778 A | 9/1997 |
| JP | H09258814 A | 10/1997 |
| JP | H10166291 A | 6/1998 |

(Continued)

OTHER PUBLICATIONS

Japanese Office Action dated Aug. 21, 2018, for Japanese Patent Application No. 2016-157081.

(Continued)

*Primary Examiner* — Bhavesh V Amin
(74) *Attorney, Agent, or Firm* — Karceski IP Law, PLLC

(57) ABSTRACT

A robot control unit for an assembly robot includes a force detecting device configured to detect forces applied to first and second works and, when the first work is fitted to the second work by a first robotic arm, a storage device stores a deflection amount table associating a force applied when fitting with the deflection amount of the robotic arm in a direction of the fitting, a deflection-amount acquiring process configured to calculate the deflection amount of the robotic arm in the direction of the fitting by using a value detected by the force detecting device and the deflection amount table, a work-position acquiring process configured to calculate a work position as the position of the first work relative to the second work in the direction of the fitting based on operation information about the robotic arm, and a real-fitting-amount acquiring process configured to correct the work position based on the calculated deflection amount.

9 Claims, 4 Drawing Sheets

(56) References Cited

FOREIGN PATENT DOCUMENTS

| | | |
|---|---|---|
| JP | 2008-221387 | 9/2008 |
| JP | 2010099784 A | 5/2010 |
| JP | 2014-188641 | 10/2014 |
| JP | 2015-168017 | 9/2015 |
| JP | 2015160271 A | 9/2015 |

OTHER PUBLICATIONS

Japanese Search Report by Registered Searching Organization dated Aug. 21, 2018, for Japanese Patent Application No. 2016-157081.

ROBOT CONTROL UNIT FOR ASSEMBLY ROBOT

CROSS-REFERENCE TO RELATED APPLICATIONS

This application is based on and claims priority to Japanese Patent Application No. 2016-157081, filed on Aug. 10, 2016, the entire content of which is incorporated herein by reference.

FIELD OF THE INVENTION

The present invention relates to a robot control unit configured to control an assembly robot configured to fit a first work to a second work.

BACKGROUND OF THE INVENTION

A known robot control unit controls an assembly robot configured to insert a shaft part fixed to a fixing part into a hole part held by a robotic arm (refer to Japanese Unexamined Patent Application, Publication No. 2008-221387, for example). This robot control unit detects a force applied to the hole part in the insertion direction when a tip end portion of the shaft part contacts a peripheral part of a hole of the hole part, and a moment about an axis line orthogonal to the insertion direction, and performs calculation based on the detected force and moment. The robot control unit uses a result of this calculation to calculate the position of contact between the tip end portion of the shaft part and the peripheral part of the hole with respect to the center of the hole, in other words, the direction and distance of the position of contact with respect to the center of the hole. Then, the robot control unit tries appropriate insertion of the shaft part into the hole part by moving the hole part or the shaft part in accordance with the calculated direction and distance.

Another known assembly robot includes a force sensor, a robotic arm configured to relatively move a first work and a second work, a work grasping unit provided at a tip end of the robotic arm, and a robot control unit configured to control the robotic arm and the grasping unit (refer to Japanese Unexamined Patent Application, Publication No. 2015-168017, for example).

This robot control unit determines whether the first work and the second work are relatively moved based on a value detected by the force sensor, an allowable range of the value, and information about the position of the grasping unit predetermined in accordance with the posture of the robotic arm. The robot control unit determines that the first work and the second work are successfully fitted when the grasping unit moves to a predetermined position.

Another known assembly robot includes a robotic arm configured to fit a second work to a first work, a camera for detecting a positional relation between the first work and the second work, and a detection means configured to detect force or sound received by the robotic arm from the works during a fitting operation (refer to Japanese Unexamined Patent Application, Publication No. 2014-188641, for example). A robot control unit for this assembly robot stores a reference graph of the generated force or sound received by the robotic arm from the works when the fitting operation is successful. The robot control unit determines whether the fitting operation is performed based on a result of the detection by the camera, and determines whether the fitting operation is successful by comparing the reference graph with temporal change of the force or sound detected by the detection means.

SUMMARY OF THE INVENTION

A first aspect of the present invention provides a robot control unit for an assembly robot configured to hold a first work by using a first holding device as a robotic arm and fit the first work to a second work held by a second holding device, the robot control unit including: a force detecting device configured to detect a force applied to the first work or the second work at the time of fitting; a storage device storing at least one of a first-work deflection amount table and a first-work deflection-amount calculation formula, the first-work deflection amount table associating at least magnitude variations of the force applied at the time of fitting with the deflection amounts of the first holding device or the deflection amounts of the first holding device and the first work in the direction of the fitting, and the first-work deflection-amount calculation formula calculating the deflection amount of the first holding device or the deflection amount of the first holding device and the first work in the direction of the fitting by using at least the magnitude of the force applied at the time of fitting as a variable; and a controller, wherein the controller is configured to conduct: a deflection-amount acquiring process to calculate a first deflection amount as the deflection amount related to the first holding device in the direction of the fitting by using a value detected by the force detecting device and at least one of the first-work deflection amount table and the first-work deflection-amount calculation formula; a work-position acquiring process to calculate a work position as a position of the first work relative to the second work in the direction of the fitting based on operation information about the first holding device; and a real-fitting-amount acquiring process to calculate a value related to a real fitting amount of the first work relative to the second work by correcting the work position using the first deflection amount.

A second aspect of the present invention provides a robot control unit for an assembly robot configured to hold a first work by using a first holding device as a robotic arm and fit the first work to a second work held by a second holding device, the robot control unit including: a force detecting device configured to detect a force applied to the first work or the second work at the time of fitting; a storage device storing at least one of a deflection amount table and a deflection-amount calculation formula, the deflection amount table associating at least the magnitude variations of force applied at the time of fitting with the deflection amounts generated between the first work and the second work in a direction of the fitting, and the deflection-amount calculation formula calculating the deflection amounts generated between the first work and the second work in the direction of the fitting by using at least the magnitude of the force applied at the time of fitting as a variable; and a controller, wherein the controller is configured to conduct: a deflection-amount acquiring process to calculate the deflection amount generated between the first work and the second work by using a value detected by the force detecting device and at least one of the deflection amount table and the deflection-amount calculation formula; a work-position acquiring process to calculate a work position as a position of the first work relative to the second work in the direction of the fitting based on operation information about the first holding device; and a real-fitting-amount acquiring process to calculate a value related to a real fitting amount of the first work relative to the second work by correcting the work position using the deflection amount.

DESCRIPTION OF EMBODIMENTS

The following describes an assembly robot according to a first embodiment of the present invention with reference to the accompanying drawings.

Figure 1:
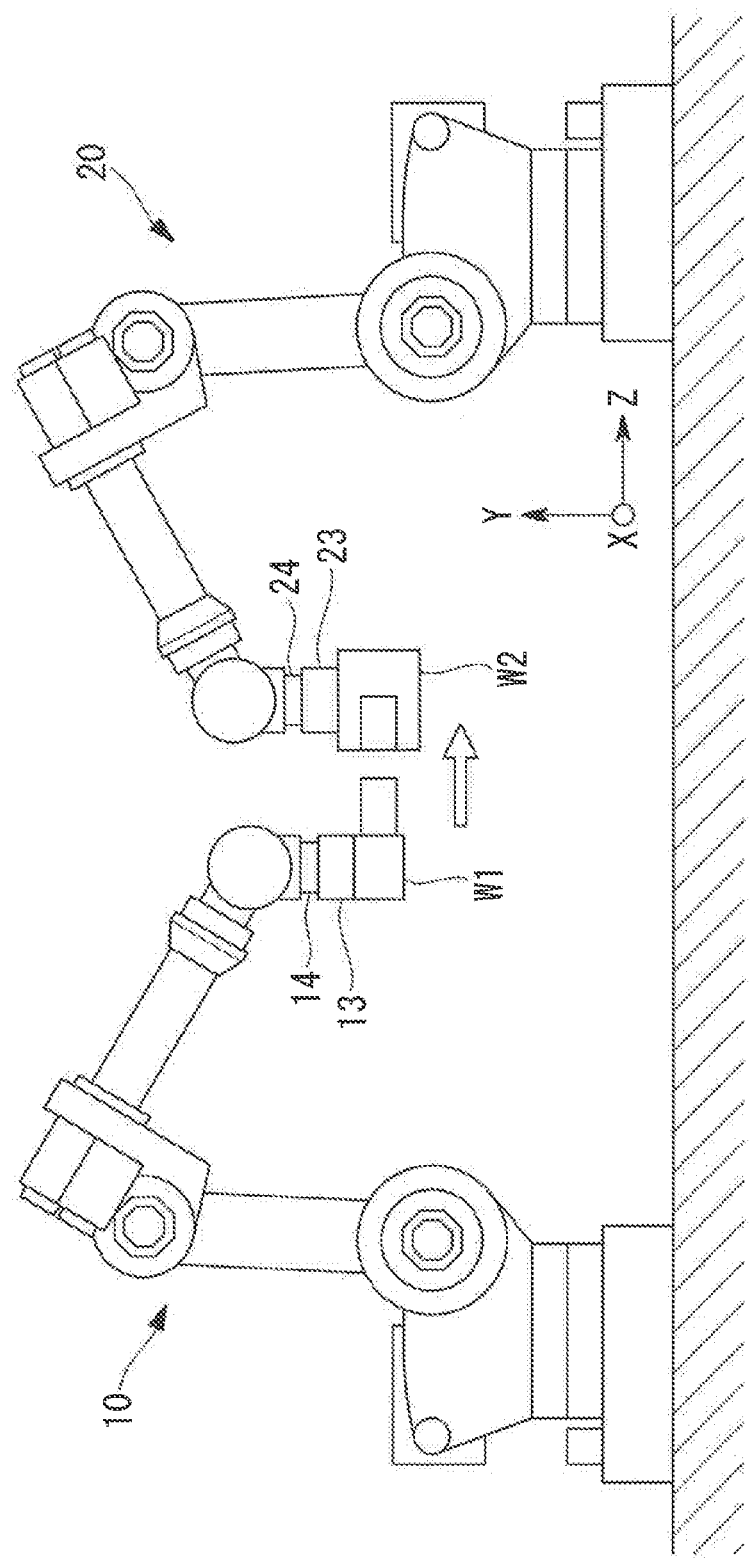
FIG. 1 is a schematic front view of an assembly robot according to a first embodiment of the present invention.
Figure 2:
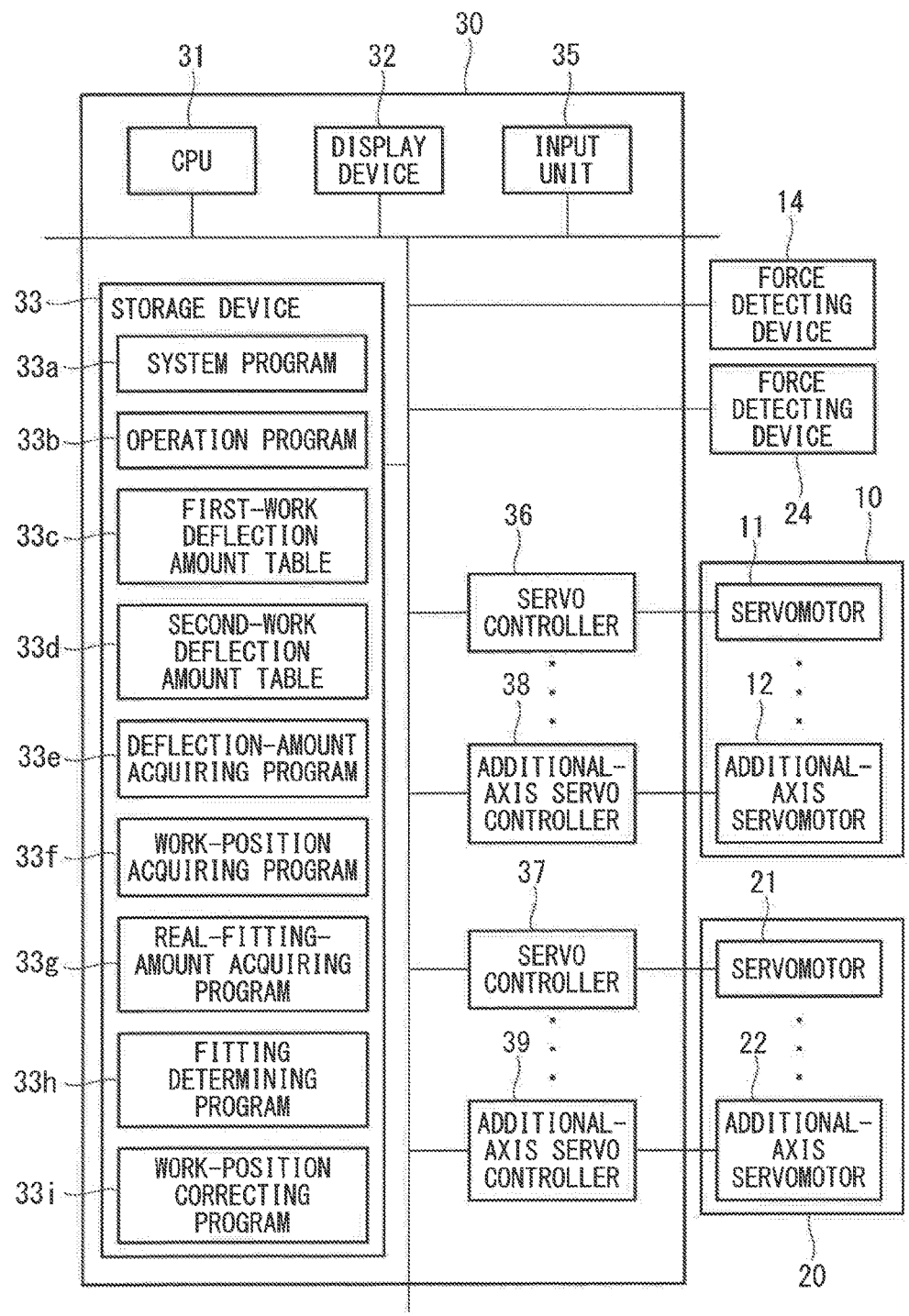
FIG. 2 is a main-part block diagram of a robot control unit of the assembly robot according to the first embodiment.

As illustrated in FIGS. 1 and 2, this assembly robot includes a first robotic arm (first holding means) 10 for holding a first work W1, a second robotic arm (second holding means) 20 for holding a second work W2, and a robot control unit 30 configured to control the first and second robotic arms 10 and 20. The assembly robot according to the present embodiment fits one of the first work W1 held by the first robotic arm and the second work W2 held by the second robotic arm to the other in the Z-axis direction illustrated in FIG. 1. In FIG. 1, the Z axis aligns with a central axis line of an insertion protrusion of the first work W1 and a central axis line of an insertion recess of the second work W2.

Although the first work W1 is inserted into the second work W2 in FIG. 1, the shapes of the first work W1 and the second work W2 are not limited to those in FIG. 1. The fitting includes fitting between a female fitment part provided on part of the second work W2 and a male fitment part provided on part of the first work W1. The first work W1 and the second work W2 may be, for example, a pair of connector components, a component provided with a female screw hole and a component provided with a male screw, or any other pair of components. In such cases, the first work W1 and the second work W2 are fitted with each other.

The first robotic arm 10 includes a plurality of movable parts and a plurality of servomotors 11 configured to drive the respective movable parts. The first robotic arm 10 includes, at a tip end portion, a chuck 13 for grasping the first work W1, and an additional-axis servomotor 12 for driving the chuck 13.

The second robotic arm 20 includes a plurality of movable parts and a plurality of servomotors 21 configured to drive the respective movable parts. The second robotic arm 20 includes, at a tip end portion, a chuck 23 for grasping the second work W2, and an additional-axis servomotor 22 for driving the chuck 23. The chucks 13 and 23 may attract works by using electromagnets. Alternatively, the chucks 13 and 23 may grasp works by using pneumatic cylinders.

The servomotors 11, 12, 21, and 22 may be various kinds of servomotors such as a rotary motor, a linear motor, or the like. The servomotors 11, 12, 21, and 22 each include a built-in operation position detecting device such as an encoder configured to detect an operation position thereof, and values detected by the operation position detecting device are transmitted to the robot control unit 30.

In the present embodiment, as illustrated in FIG. 2, the robot control unit 30 includes a CPU 31 as a main processor, a display device 32, a storage device 33 including, for example, a non-transitory memory, a RAM, an input unit 35 that is operated to produce operation programs for the robotic arms 10 and 20, a plurality of servo controllers 36 provided for the respective servomotors 11, a plurality of servo controllers 37 provided for the respective servomotors 21, and servo controllers 38 and 39 provided for the respective servomotors 12 and 22. The servo controllers 36, 37, 38, and 39 each include a processor and storage devices such as a ROM and a RAM, and controls the operation position, operation speed, and the like of the corresponding one of the servomotors 11, 12, 21, and 22 by transmitting drive signals to a servo amplifier of the servomotor.

The storage device 33 stores a system program 33a that provides a basic function of the robot control unit 30. The storage device 33 also stores at least one operation program 33b made by using, for example, the input unit 35. For example, the CPU 31 of the robot control unit 30 operates based on the system program 33a, and reads the operation program 33b stored in the storage device 33, temporarily stores the read operation program 33b in the RAM, and transmits control signals to the servo controllers 36, 37, 38, and 39 according to the read operation program 33b, thereby controlling the servo amplifiers of the servomotors 11, 12, 21, and 22.

For example, when the robot control unit 30 has received a predetermined operation start signal, the first work W1 at a first work storing place is held by the first robotic arm 10, and the second work W2 at a second work storing place is held by the second robotic arm 20. Then, the first robotic arm 10 and the second robotic arm 20 actuate to fit the first work W1 and the second work W2 to each other. When the fitting is successful, the fitted first and second works W1 and W2 are placed at a predetermined work storing place by, for example, the first robotic arm 10.

A force detecting device 14 configured to detect force applied to the first work W1 when fitting is provided at the tip end portion of the first robotic arm 10. The force detecting device 14 may be built in the chuck 13 or may be disposed closer to a proximal end of the robotic arm 10 than the chuck 13. In the present embodiment, the force detecting device 14 is a six-axis force sensor. A value detected by the force detecting device 14 is transmitted to the robot control unit 30. The CPU 31 of the robot control unit 30 calculates, based on the received detected value, forces and moments acting on the first work W1 such as a force in the Z-axis direction, a force in the X axis direction orthogonal to the Z axis, a force in the Y-axis direction orthogonal to the Z axis and the X axis, a moment about the X axis, a moment about the Y axis, and a moment about the Z axis. The force detecting device 14 may be a three-axis force sensor or may be any other force sensor. There are available force sensors configured to detect force by, for example, using a deflection gauge, detecting capacitance change, and optically detecting deflection. The force sensor in this example may be any of these sensors.

The storage device 33 also stores a first-work deflection amount table 33c associating the magnitude variations of force applied to the first work W1 or the second work W2 when fitting with deflection amounts in the Z-axis direction of the first robotic arm 10 and the first work W1 held by the first robotic arm 10. In the first-work deflection amount table 33c, various forces expected to be applied when fitting are associated with the moving amount and moving direction of the first work W1 when the various forces are applied to the first work W1 while the first robotic arm 10 is grasping the first work W1 and held in a posture for fitting. This moving amount corresponds to deflection.

A force detecting device 24 configured to detect a force applied to the second work W2 when fitting is provided at the tip end portion of the second robotic arm 20. The force detecting device 24 may be built in the chuck 23 or may be disposed closer to a proximal end of the second robotic arm 20 than the chuck 23. The force detecting device 24 has a function which is the same as or similar to the force detecting device 14. Similarly to the case with the force detecting device 14, the CPU 31 of the robot control unit 30 calculates, based on a value detected by the force detecting device 24, forces and moments acting on the second work W2 such as a force in the Z-axis direction, a force in the X-axis direction orthogonal to the Z axis, a force in the Y-axis direction orthogonal to the Z axis and the X axis, a moment about the X axis, a moment about the Y axis, and a moment about the Z axis.

The storage device 33 also stores a second-work deflection amount table 33d associating the magnitude variations of force applied to the first work W1 or the second work W2 when fitting, with the deflection amounts in the Z-axis direction of the second robotic arm 20 and the second work W2 held by the second robotic arm 20. In the second-work deflection amount table 33d, various forces expected to be applied to the second work W2 when fitting are associated with the moving amount and moving direction of the second work W2 when the various forces are applied while the second robotic arm 20 is grasping the second work W2 and held in a posture for fitting. This moving amount corresponds to deflection.

In the fitting operation, the CPU 31 operates based on a deflection-amount acquiring program 33e stored in the storage device 33. Specifically, the CPU 31 continuously receives values detected by at least one of the force detecting device 14 and the force detecting device 24, and calculates a first deflection amount as the deflection amount of the first robotic arm 10 in the Z-axis direction by referring to the first-work deflection amount table 33c. Simultaneously, the CPU 31 operates based on the deflection-amount acquiring program 33e. Specifically, the CPU 31 continuously receives values detected by at least one of the force detecting device 14 and the force detecting device 24, and calculates a second deflection amount as the deflection amount of the second robotic arm 20 in the Z-axis direction by referring to the second-work deflection amount table 33d.

When the deflection amount tables 33c and 33d include no data matching with values detected by the force detecting device 14 and the force detecting device 24, the first deflection amount and the second deflection amount may be set to deflection amounts for forces close to these detected values or may be obtained through predetermined interpolation calculation.

The CPU 31 operates based on a work-position acquiring program 33f stored in the storage device 33. Specifically, the CPU 31 continuously calculates the position of the first work W1 in the Z-axis direction and the position of the second work W2 in the Z-axis direction. In the present embodiment, the position of an intersection between a leading surface of the insertion protrusion of the first work W1 and the central axis line thereof is calculated as the position of the first work W1 in the Z-axis direction, and the position of an intersection between an opening surface of the insertion recess of the second work W2 and the central axis line thereof is calculated as the position of the second work W2 in the Z-axis direction. However, any other points may be calculated as the positions of the first and second works W1 and W2.

The position of the first work W1 in the Z-axis direction is obtained through well-known forward kinematics calculation based on, for example, the origin position of the first robotic arm 10, a detected value received from the operation position detecting device built in each servomotor 11, and each link length of the first robotic arm 10. The position of the second work W2 in the Z-axis direction is obtained through well-known forward kinematics calculation based on, for example, the origin position of the second robotic arm 20, a detected value received from the operation position detecting device built in each servomotor 21, and each link length of the second robotic arm 20. Thus, the calculated positions of the first and second works W1 and W2 in the Z-axis direction are positions derived from operation information about the robotic arms 10 and 20 without taken into account deflection in the Z-axis direction.

The CPU 31 operates based on a work-position acquiring program 33f. Specifically, the CPU 31 continuously calculates a work position as the position of the first work W1 relative to the second work W2 in the Z-axis direction based on the calculated positions of the first and second works W1 and W2 in the Z-axis direction.

The CPU 31 operates based on a real-fitting-amount acquiring program 33g stored in the storage device 33. Specifically, the CPU 31 continuously calculates the actual position of the first work W1 relative to the second work W2 by correcting the work position based on the first deflection amount and the second deflection amount. This actual position is a position (value representing the position) indicating the degree of fitting of the first work W1 to the second work W2, and such a value is related to a real fitting amount.

Subsequently, the CPU 31 operates based on a fitting determining program 33h stored in the storage device 33. Specifically, the CPU 31 determines whether the fitting of the first work W1 and the second work W2 is successful based on whether the actual position is equal to or larger than a predetermined threshold.

For example, when the actual position becomes a value indicating a state in which the first work W1 is inserted to a position relative to the second work W2 by 50 mm in the Z-axis direction, the CPU 31 determines that the fitting of the first work W1 and the second work W2 is successful. When the value detected by at least one of the force detecting device 14 and the force detecting device 24 becomes equal to or larger than the predetermined threshold before the first work W1 is inserted to the position relative to the second work W2 by 50 mm in the Z-axis direction, the CPU 31 determines that the fitting of the first work W1 and the second work W2 is not successful.

The publicly-known force control may be used to control the robotic arms 10 and 20 such that values detected by the force detecting devices 14 and 24 at the time of fitting operation do not exceed predetermined upper limits. In this case, when a predetermined time has elapsed before the actual position becomes equal to or larger than a predetermined threshold, the CPU 31 determines that the fitting is not successful.

The operation program stored in the storage device 33 may be configured to operate, when it is determined that the fitting is not successful, the robotic arms 10 and 20 to start fitting operation again after at least one of the robotic arms 10 and 20 is operated such that the first work W1 and the second work W2 move in directions parallel to the Z axis and relative to each other, and at least one of the robotic arms 10 and 20 is operated in a direction orthogonal to the Z axis such that the central axes of the first and second works W1 and W2 are aligned with each other.

In the present embodiment, when it is determined that the fitting is not successful, the first work W1 is operated in the Z-axis direction by the first robotic arm 10 to cancel the fitting by separating the first work W1 and the second work W2 from each other, and the CPU 31 operates based on a work-position correcting program 33i stored in the storage device 33. Specifically, the CPU 31 estimates in which direction the first work W1 is shifted relative to the second work W2 among directions orthogonal to the Z axis in accordance with, for example, a force in the Z-axis direction and moments about the X axis and the Y axis detected by the force detecting device 24 when it is determined the fitting is not successful. Then, the CPU 31 adjusts the position of the first work W1 in the direction orthogonal to the Z axis by driving the first robotic arm 10 to reduce the amount of the shift. Thereafter, fitting operation is performed again by the operation program.

According to the present embodiment, the deflection amount of the first robotic arm 10 in the Z-axis direction and the deflection amount of the second robotic arm 20 in the Z-axis direction are calculated based on a force applied to the first work W1 or the second work W2 when fitting. Then, the position of the first work W1 relative to the second work W2 calculated by using, for example, the operation information about the first robotic arm 10 and the second robotic arm 20 is corrected based on the calculated deflection amounts. This improves the accuracy of the determination as to whether the fitting of the first work W1 and the second work W2 is successful.

Figure 3:
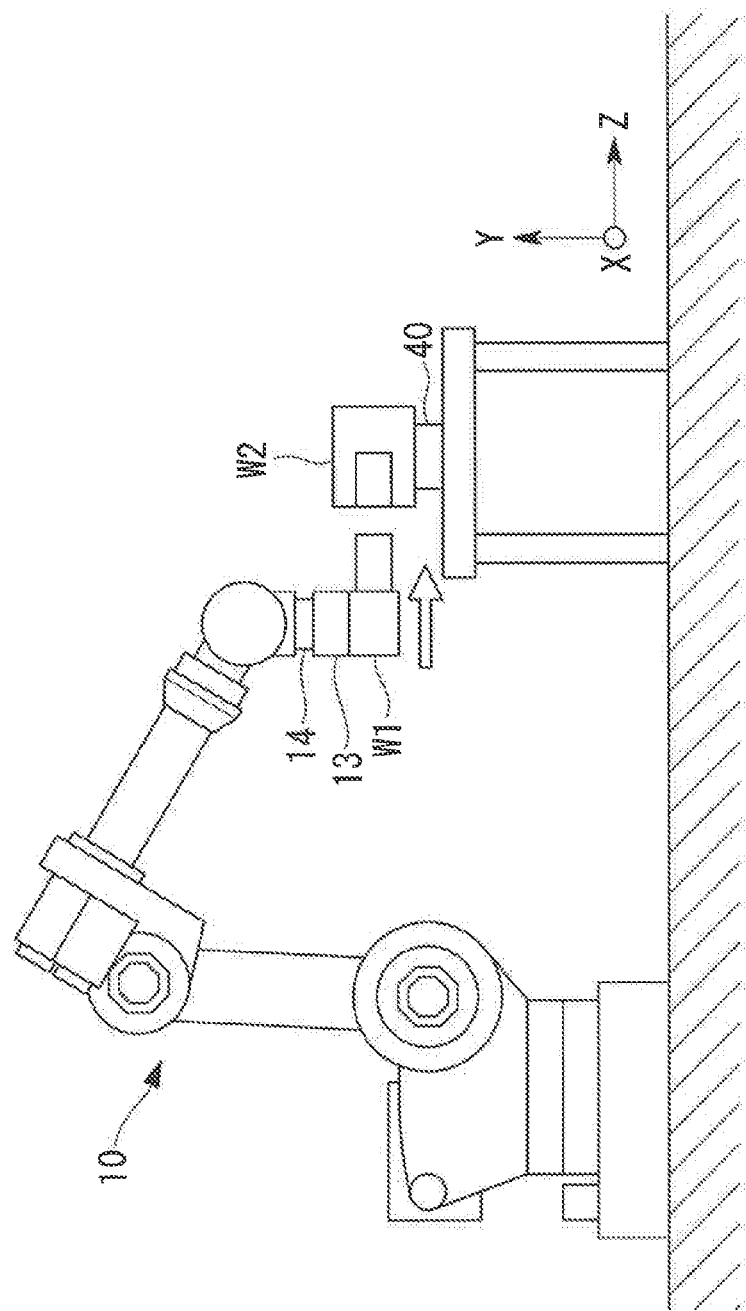
FIG. 3 is a schematic front view illustrating a modification of the assembly robot according to the first embodiment.

In the present embodiment, the second work W2 is held by the second robotic arm 20. However, as illustrated in FIG. 3, the second work W2 may be fixed through a chuck 40 fixed to an installation surface and may be prevented from moving relative to the installation surface. In this case, the force detecting device 14 is provided, for example, at the tip end portion of the robotic arm 10 or inside the chuck 40. FIG. 3 illustrates an example in which the force detecting device 14 is provided at the tip end portion of the robotic arm 10.

In this case, too, the first work W1 is fitted to the second work W2 by the first robotic arm 10. To achieve this, the CPU 31 operates based on the deflection-amount acquiring program 33e stored in the storage device 33. Specifically, the CPU 31 continuously receives values detected by the force detecting device 14, and calculates the first deflection amount as the deflection amount of the first robotic arm 10 in the Z-axis direction by referring to the first-work deflection amount table 33c.

The CPU 31 also operates based on the work-position acquiring program 33f stored in the storage device 33. Specifically, the CPU 31 continuously calculates the position of the first work W1 in the Z-axis direction, and also continuously calculates the work position as the position of the first work W1 relative to the second work W2 in the Z-axis direction.

The CPU 31 also operates based on the real-fitting-amount acquiring program 33g stored in the storage device 33. Specifically, the CPU 31 continuously calculates the actual position of the first work W1 relative to the second work W2 by correcting the work position based on the first deflection amount.

Then, the CPU 31 operates based on the fitting determining program 33h stored in the storage device 33. Specifically, the CPU 31 determines whether the fitting of the first work W1 and the second work W2 is successful based on whether the actual position is equal to or larger than a predetermined threshold.

When it is determined that the fitting is not successful, the position of the first work W1 relative to the second work W2 in the direction orthogonal to the Z axis is adjusted by driving the first robotic arm 10.

In this case, too, the deflection amount of the first robotic arm 10 in the Z-axis direction is calculated based on the force applied to the first work W1 or the second work W2 when fitting, and the position of the first work W1 relative to the second work W2 calculated based on the operation information about the first robotic arm 10 is corrected based on the calculated deflection amount. This improves the accuracy of the determination as to whether the fitting of the first work W1 and the second work W2 is successful.

Figure 4:
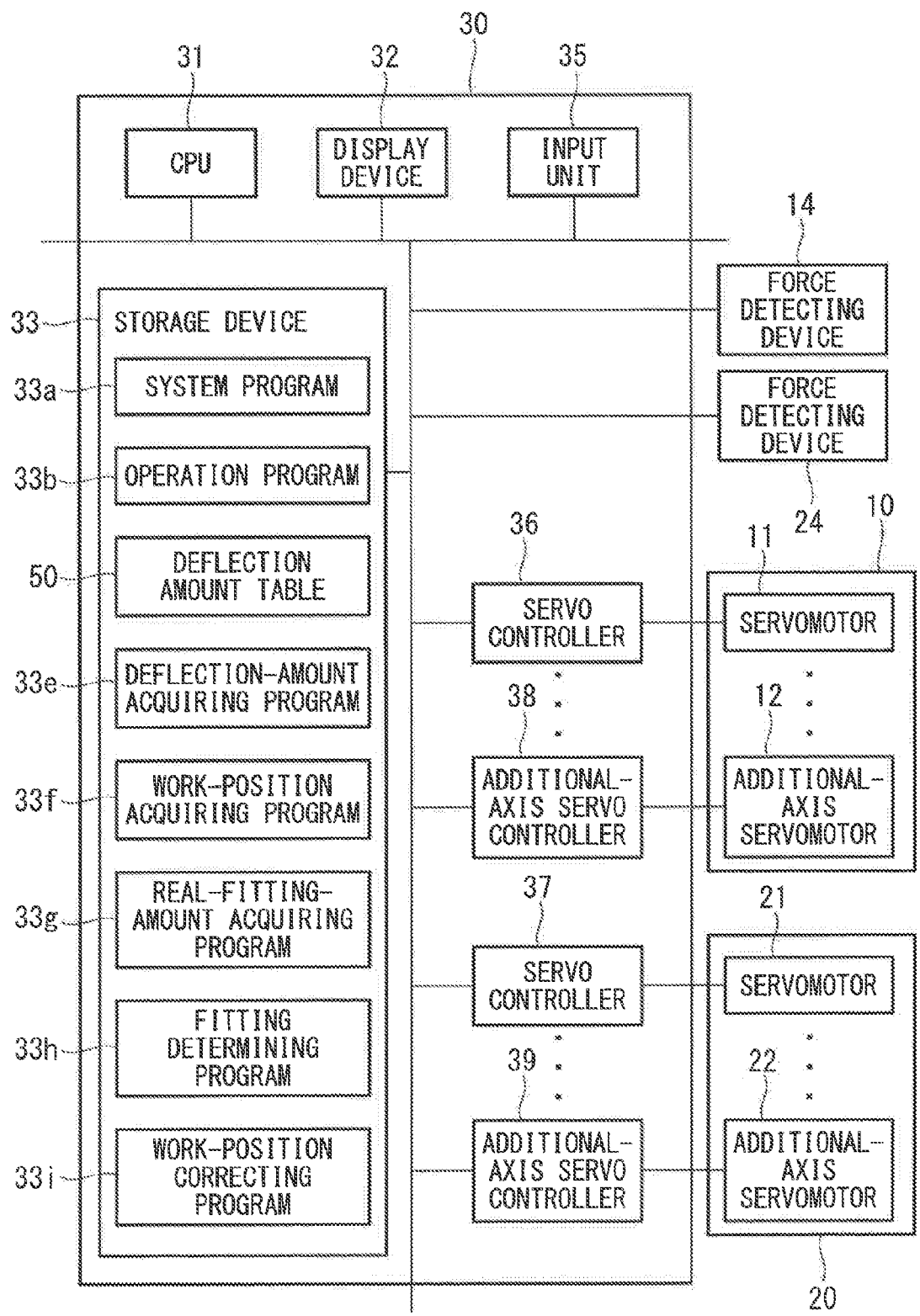
FIG. 4 is a main-part block diagram of a robot control unit of an assembly robot according to a second embodiment.

The following describes an assembly robot according to a second embodiment of the present invention with reference to FIG. 4.

In the first embodiment, as illustrated in FIG. 2, the first-work deflection amount table 33c associating a force applied to a work with the deflection amount of the first robotic arm 10, and the second-work deflection amount table 33d associating a force applied to a work with the deflection amount of the second robotic arm 20 are used.

However, in the present embodiment, the storage device 33 stores a deflection amount table 50 associating various degree of force applied to a work with total deflection amounts of the deflection amounts of the first robotic arm 10 and the deflection amounts of the second robotic arm 20.

Any other configuration is same as that in the first embodiment. Any component same as that in the first embodiment is denoted by an identical reference sign in the drawings, and description thereof will be omitted. Description of any operation same as that in the first embodiment will be also omitted.

The storage device 33 stores the deflection amount table 50 associating the magnitude of the force applied to the first work W1 or the second work W2 when fitting with the total deflection amount summing the deflection amounts of the first robotic arm 10 and the first work W1 held by the first robotic arm 10 in the Z-axis direction and the deflection amounts of the second robotic arm 20 and the second work W2 held by the second robotic arm 20 in the Z-axis direction. The total deflection amount corresponds to the amount of deflection generated between the first work W1 and the second work W2 in the Z-axis direction.

In the deflection amount table 50, various forces applied on the first work W1 and the second work W2 to separate the works from each other in the Z-axis direction after the first work W1 held by the first robotic arm 10 is fitted to the second work W2 held by the second robotic arm 20 in the Z-axis direction are associated with the sum of the absolute value of the moving amount of the first work W1 in the Z-axis direction with respect to a reference position on the installation surface and the absolute value of the moving amount of the second work W2 in the Z-axis direction with respect to the reference position when the various forces are applied.

In the fitting operation, the CPU 31 operates based on the deflection-amount acquiring program 33e stored in the storage device 33. Specifically, the CPU 31 continuously receives values detected by at least one of the force detecting device 14 and the force detecting device 24, and calculates the total deflection amount of the deflection amount of the first robotic arm 10 in the Z-axis direction and the deflection amount of the second robotic arm 20 in the Z-axis direction by referring to the deflection amount table 50.

Then, the CPU 31 operates based on the real-fitting-amount acquiring program 33g stored in the storage device 33. Specifically, the CPU 31 continuously calculates the actual position of the first work W1 relative to the second work W2 by correcting the work position based on the total deflection amount.

Subsequently, the CPU 31 operates based on the fitting determining program 33h stored in the storage device 33. Specifically, the CPU 31 determines whether the fitting of the first work W1 and the second work W2 is successful based on whether the actual position is equal to or larger than a predetermined threshold.

According to the present embodiment, the total deflection amount of the deflection amount of the first robotic arm 10 in the Z-axis direction and the deflection amount of the second robotic arm 20 in the Z-axis direction is calculated based on the force applied to the first work W1 or the second work W2 when fitting. Then, the position of the first work W1 relative to the second work W2 calculated based on the operation information about the first robotic arm 10 and the second robotic arm 20 is corrected based on the calculated total deflection amount. This improves the accuracy of the determination as to whether the fitting of the first work W1 and the second work W2 is successful.

In the second embodiment, the second work W2 is held by the second robotic arm 20. However, as illustrated in FIG. 3, the second work W2 may be fixed through the chuck 40 fixed to the installation surface and may be prevented from moving relative to the installation surface. The force detecting device 14 is provided, for example, at the tip end portion of the robotic arm 10 or inside the chuck 40. FIG. 3 illustrates an example in which the force detecting device 14 is provided at the tip end portion of the robotic arm 10.

In this case, in the deflection amount table 50, various forces applied on the first work W1 and the second work W2 to separate the works from each other in the Z-axis direction when the first work W1 held by the first robotic arm 10 is made contact with the second work W2 fixed through the chuck 40 in the Z-axis direction are associated with the sum of the absolute value of the moving amount of the first work W1 in the Z-axis direction with respect to a reference position on the installation surface and the absolute value of the moving amount of the second work W2 in the Z-axis direction with respect to the reference position when the various forces are applied. The association may be performed only on the absolute value of the moving amount of the first work W1 in the Z-axis direction when the second work W2 is kept effectively immobile.

The CPU 31 operates based on the deflection-amount acquiring program 33e stored in the storage device 33. Specifically, the CPU 31 continuously receives values detected by the force detecting device 14, and calculates the total deflection amount of the deflection amount of the first robotic arm 10 in the Z-axis direction and the deflection amount of the chuck 40 in the Z-axis direction by referring to the deflection amount table 50.

In this case, too, the total deflection amount is calculated based on the force applied to the first work W1 or the second work W2 when fitting, and the position of the first work W1 relative to the second work W2 calculated based on the operation information about the first robotic arm 10 is corrected based on the total deflection amount. This improves the accuracy of the determination as to whether the fitting of the first work W1 and the second work W2 is successful.

In the above-described embodiments, an image capturing apparatus configured to capture an image of the state of fitting between the first work W1 and the second work W2 may be provided. In this case, the CPU 31 operates based on the real-fitting-amount acquiring program 33g stored in the storage device 33. Specifically, the CPU 31 corrects the work position based on the calculated deflection amount and further based on data obtained through the image capturing by the image capturing apparatus. Accordingly, a more accurate value related to the real fitting amount can be obtained.

In the above-described embodiments, deflection amounts are calculated based on values detected by the force detecting devices 14 and 24, the first-work deflection amount table, the second-work deflection amount table, and the deflection amount table. However, the storage device 33 may store a calculation formula that calculates the moving amount of the first work W1 by using, as a variable, a force expected to be applied to the first work W1 at the time of fitting when the first robotic arm 10 is grasping the first work W1 and held in a posture for fitting. This calculation formula is, for example, a linear function related to elasticity coefficients of the first robotic arm 10 in the posture and the first work W1 in the Z-axis direction.

Similarly, the storage device 33 may store a calculation formula that calculates the moving amount of the second work W2 by using, as a variable, a force expected to be applied to the second work W2 at the time of fitting when the second robotic arm 20 is grasping the second work W2 and held in a posture for fitting. The storage device 33 may store a calculation formula that calculates the total deflection amount summing the absolute value of the moving amount of the first work W1 in the Z-axis direction with respect to a reference position on the installation surface and the absolute value of the moving amount of the second work W2 in the Z-axis direction with respect to the reference position by using, as variables, forces applied to the first work W1 and the second work W2 to separate the works from each other in the Z-axis direction when the first work W1 held by the first robotic arm 10 is made contact with the second work W2 held by the second robotic arm 20 or the chuck 40 in the Z-axis direction.

In this case, similarly to the above-described embodiments, the first deflection amount, the second deflection amount, and the total deflection amount can be calculated by applying, to the calculation formula, a value detected by the force detecting device 14 or the force detecting device 24. Alternatively, these deflection amounts may be calculated by applying the value detected by the force detecting device 14 or the force detecting device 24 to both of the deflection amount table and the calculation formula.

The deflection amount tables in the first embodiment associate various forces with the sum of the deflection amount of the first robotic arm 10 and the deflection amount of the first work W1 and the sum of the deflection amount of the second robotic arm 20 and the deflection amount of the second work W2. However, the deflection amount tables in the first embodiment may associate various forces with the deflection amount of the first robotic arm 10 and the deflection amount of the second robotic arm 20.

In this case, too, the deflection amount of the first robotic arm 10 in the Z-axis direction and the deflection amount of the second robotic arm 20 in the Z-axis direction are calculated based on the force applied to the first work W1 or the second work W2 when fitting, thereby achieving an effect same as that of the first embodiment.

The inventor has arrived at the following aspects of the present invention.

A first aspect of the present invention provides a robot control unit for an assembly robot configured to hold a first work by using a first holding means as a robotic arm and fit the first work to a second work held by a second holding means, the robot control unit including: a force detecting means configured to detect a force applied to the first work or the second work at the time of fitting; a storage device storing at least one of a first-work deflection amount table and a first-work deflection-amount calculation formula, the first-work deflection amount table associating at least magnitude variations of the force applied at the time of fitting with the deflection amounts of the first holding means or the deflection amounts of the first holding means and the first work in the direction of the fitting, and the first-work deflection-amount calculation formula calculating the deflection amount of the first holding means or the deflection amount of the first holding means and the first work in the direction of the fitting by using at least the magnitude of the force applied at the time of fitting as a variable; a deflection-amount acquiring means configured to calculate a first deflection amount as the deflection amount related to the first holding means in the direction of the fitting by using a value detected by the force detecting means and at least one of the first-work deflection amount table and the first-work deflection-amount calculation formula; a work-position acquiring means configured to calculate a work position as a position of the first work relative to the second work in the direction of the fitting based on operation information about the first holding means; and a real-fitting-amount acquiring means configured to calculate a value related to a real fitting amount of the first work relative to the second work by correcting the work position using the first deflection amount.

In this aspect, the deflection amount of the first holding means or the deflection amount of the first holding means and the first work in the direction of the fitting are calculated based on the force applied to the first work or the second work at the time of fitting, and the position of the first work relative to the second work calculated based on the operation information about the first holding means is corrected based on the calculated deflection amount. This improves the accuracy of determination as to whether the fitting between the first work and the second work is successful.

Since the accuracy of determination as to whether the fitting is successful can be increased without using an image capturing apparatus such as a camera, the robot control unit is applicable to works having complicated shapes or a manufacturing sight with densely arranged machines and devices.

In the above-described aspect, it is preferable that: the second holding means is a robotic arm configured to hold the second work, the storage device stores at least one of a second-work deflection amount table and a second-work deflection-amount calculation formula, the second-work deflection amount table associating at least the magnitude variations of force applied at the time of fitting with the deflection amounts of the second holding means or the deflection amounts of the second holding means and the second work in the direction of the fitting, and the second-work deflection-amount calculation formula calculating the deflection amount of the second holding means or the deflection amount of the second holding means and the second work in the direction of the fitting by using at least the magnitude of a force applied at the time of fitting as a variable, the work-position acquiring means calculates the work position based on operation information about the first holding means and operation information about the second holding means, the deflection-amount acquiring means calculates a second deflection amount as the deflection amount related to the second holding means in the direction of the fitting by using the value detected by the force detecting means and at least one of the second-work deflection amount table and the second-work deflection-amount calculation formula, and the real-fitting-amount acquiring means calculates the value related to the real fitting amount of the first work relative to the second work by correcting the work position using the first deflection amount and the second deflection amount.

With this configuration, since the deflection amounts of both robotic arms are corrected, a more accurate value related to the real fitting amount is obtained.

A second aspect of the present invention provides a robot control unit for an assembly robot configured to hold a first work by using a first holding means as a robotic arm and fit the first work to a second work held by a second holding means, the robot control unit comprising: a force detecting means configured to detect a force applied to the first work or the second work at the time of fitting; a storage device storing at least one of a deflection amount table and a deflection-amount calculation formula, the deflection amount table associating at least the magnitude variations of force applied at the time of fitting with the deflection amounts generated between the first work and the second work in a direction of the fitting, and the deflection-amount calculation formula calculating the deflection amounts generated between the first work and the second work in the direction of the fitting by using at least the magnitude of the force applied at the time of fitting as a variable; a deflection-amount acquiring means configured to calculate the deflection amount generated between the first work and the second work by using a value detected by the force detecting means and at least one of the deflection amount table and the deflection-amount calculation formula; a work-position acquiring means configured to calculate a work position as a position of the first work relative to the second work in the direction of the fitting based on operation information about the first holding means; and a real-fitting-amount acquiring means configured to calculate a value related to a real fitting amount of the first work relative to the second work by correcting the work position using the deflection amount.

In this aspect, the amount of deflection generated between the first work and the second work is calculated based on the force applied to the first work or the second work at the time of fitting, and the position of the first work relative to the second work calculated based on the operation information about the first holding means is corrected based on the calculated deflection amount. This improves the accuracy of determination as to whether the fitting between the first work and the second work is successful.

Since the accuracy of determination as to whether the fitting is successful can be increased without using an image capturing apparatus such as a camera, the robot control unit is applicable to works having complicated shapes or a manufacturing sight with densely arranged machines and devices.

In each aspect, the second holding means may fix the second work and prevent the second work from moving relative to an installation surface of the assembly robot.

In each aspect, a fitting determining means may be further provided. The fitting determining means is configured to determine whether the fitting between the first work and the second work is successful based on whether the value related to the real fitting amount calculated by the real-fitting-amount acquiring means is equal to or larger than a predetermined threshold.

In each aspect, the real-fitting-amount acquiring means may calculate the value related to the real fitting amount also based on a result of detection by an image capturing means configured to detect the position of the first work relative to the second work. In this case, a more accurate value related to the real fitting amount can be obtained.

In the aspect, the fitting determining means may determine the fitting between the first work and the second work is not successful when the value detected by the force detecting means is equal to or larger than a predetermined threshold.

This configuration can prevent unnecessary damage on a work and a chuck for grasping the work.

In the aspect, it is preferable that, when the fitting determining means determines that the fitting is not successful, at least one of the first holding means and the second holding means is driven to cancel the fitting between the first work and the second work, and at least one of the first holding means and the second holding means is driven to correct a position of the first work relative to the second work in a direction orthogonal to the direction of the fitting based on estimation of a direction of a positional shift of the first work relative to the second work in the orthogonal direction based on the value detected by the force detecting means.

With this configuration, the fitting between the first work and the second work can be automatically tried again.

In each aspect, it is preferable that the robot control unit is configured so that the value detected by the force detecting means when the fitting of the first work to the second work is performed does not exceed a predetermined upper limit.

This configuration can prevent unnecessary damage on, for example, a chuck for grasping a work, the work, and the robotic arms.

The aforementioned aspects can reduce labor on instruction word for a robot and facilitate management of operation of the robot.

The invention claimed is:

1. A robot control unit for an assembly robot configured to hold a first work by using a first holding device as a robotic arm and fit the first work to a second work held by a second holding device, the robot control unit comprising:
a force detecting device configured to detect a force applied to the first work or the second work at the time of fitting;
a storage device storing at least one of a first-work deflection amount table and a first-work deflection-amount calculation formula, the first-work deflection amount table associating at least magnitude variations of the force applied at the time of fitting with the deflection amounts of the first holding device or the deflection amounts of the first holding device and the first work in the direction of the fitting, and the first-work deflection-amount calculation formula calculating the deflection amount of the first holding device or the deflection amount of the first holding device and the first work in the direction of the fitting by using at least the magnitude of the force applied at the time of fitting as a variable; and
a controller, wherein the controller is configured to conduct:
a deflection-amount acquiring process to calculate a first deflection amount as the deflection amount related to the first holding device in the direction of the fitting by using a value detected by the force detecting device and at least one of the first-work deflection amount table and the first-work deflection-amount calculation formula;
a work-position acquiring process to calculate a work position as a position of the first work relative to the second work in the direction of the fitting based on operation information about the first holding device; and
a real-fitting-amount acquiring process to calculate a value related to a real fitting amount of the first work relative to the second work by correcting the work position using the first deflection amount so as to obtain the fitting amount of the work in consideration of the deflection of the first holding means in the fitting direction at the time of the fitting.

2. The robot control unit according to claim 1, wherein the second holding device is a robotic arm configured to hold the second work,
the storage device stores at least one of a second-work deflection amount table and a second-work deflection-amount calculation formula, the second-work deflection amount table associating at least the magnitude variations of force applied at the time of fitting with the deflection amounts of the second holding device or the deflection amounts of the second holding device and the second work in the direction of the fitting, and the second-work deflection-amount calculation formula calculating the deflection amount of the second holding device or the deflection amount of the second holding device and the second work in the direction of the fitting by using at least the magnitude of a force applied at the time of fitting as a variable, and
the controller is configured to:
in the work-position acquiring process, calculate the work position based on operation information about the first holding device and operation information about the second holding device;
in the deflection-amount acquiring process, calculate a second deflection amount as the deflection amount related to the second holding device in the direction of the fitting by using the value detected by the force detecting device and at least one of the second-work deflection amount table and the second-work deflection-amount calculation formula; and
in the real-fitting-amount acquiring process, calculate the value related to the real fitting amount of the first work relative to the second work by correcting the work position using the first deflection amount and the second deflection amount so as to obtain the fitting amount of the first work relative to the second work in consideration of the deflections of the first holding means and the second holding means in the fitting directions at the time of the fitting.

3. A robot control unit for an assembly robot configured to hold a first work by using a first holding device as a robotic arm and fit the first work to a second work held by a second holding device, the robot control unit comprising:
a force detecting device configured to detect a force applied to the first work or the second work at the time of fitting;
a storage device storing at least one of a deflection amount table and a deflection-amount calculation formula, the deflection amount table associating at least the magnitude variations of force applied at the time of fitting with the deflection amounts generated between the first work and the second work in a direction of the fitting, and the deflection-amount calculation formula calculating the deflection amounts generated between the first work and the second work in the direction of the fitting by using at least the magnitude of the force applied at the time of fitting as a variable; and a controller, wherein the controller is configured to conduct:
a deflection-amount acquiring process to calculate the deflection amount generated between the first work and the second work by using a value detected by the force detecting device and at least one of the deflection amount table and the deflection-amount calculation formula;
a work-position acquiring process to calculate a work position as a position of the first work relative to the second work in the direction of the fitting based on operation information about the first holding device; and
a real-fitting-amount acquiring process to calculate a value related to a real fitting amount of the first work relative to the second work by correcting the work position using the deflection amount so as to obtain the fitting amount of the first work relative to the second work in consideration of the deflections of the first holding means and the second holding means in the fitting directions at the time of the fitting.

4. The robot control unit according to claim 1, wherein, in the real-fitting-amount acquiring process, the controller calculates the value related to the real fitting amount also based on a result of detection by an image capturing device configured to detect the position of the first work relative to the second work.

5. The robot control unit according to claim 1, wherein the second holding device fixes the second work and prevents the second work from moving relative to an installation surface of the assembly robot.

6. The robot control unit according to claim 1, wherein the controller is further configured to conduct a fitting determining process to determine whether the fitting between the first work and the second work is successful based on whether the value related to the real fitting amount calculated by the real-fitting-amount acquiring process is equal to or larger than a predetermined threshold.

7. The robot control unit according to claim 6, wherein, in the fitting determining process, the controller determines that the fitting between the first work and the second work is not successful when the value detected by the force detecting device is equal to or larger than a predetermined threshold.

8. The robot control unit according to claim 6, wherein, when the fitting determining process determines that the fitting is not successful, at least one of the first holding device and the second holding device is driven to cancel the fitting between the first work and the second work, and at least one of the first holding device and the second holding device is driven to correct a position of the first work relative to the second work in a direction orthogonal to the direction of the fitting based on estimation of a direction of a positional shift of the first work relative to the second work in the orthogonal direction based on the value detected by the force detecting device.

9. The robot control unit according to claim 1, wherein the robot control unit is configured so that the value detected by the force detecting device when the fitting of the first work to the second work is performed does not exceed a predetermined upper limit.

* * * * *